(12) United States Patent
Herzig

(10) Patent No.: US 8,084,552 B2
(45) Date of Patent: *Dec. 27, 2011

(54) METHOD FOR PRODUCING SILICONE POLYETHERS

(75) Inventor: Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/921,044

(22) PCT Filed: Mar. 3, 2009

(86) PCT No.: PCT/EP2009/052479
§ 371 (c)(1),
(2), (4) Date: Sep. 3, 2010

(87) PCT Pub. No.: WO2009/109560
PCT Pub. Date: Sep. 11, 2009

(65) Prior Publication Data
US 2011/0040036 A1    Feb. 17, 2011

(30) Foreign Application Priority Data

Mar. 5, 2008 (DE) .......................... 10 2008 000 525

(51) Int. Cl.
*C08F 283/06* (2006.01)
*C08F 283/12* (2006.01)
*C08G 77/46* (2006.01)

(52) U.S. Cl. ........................................ 525/479; 528/31

(58) Field of Classification Search .................... 525/479
See application file for complete search history.

(56) References Cited

U.S. PATENT DOCUMENTS

| | | | | |
|---|---|---|---|---|
| 2,970,150 A * | 1/1961 | Bailey | ........................... | 549/215 |
| 4,417,068 A | 11/1983 | Kollmeier | | |
| 5,159,096 A * | 10/1992 | Austin et al. | ................... | 556/445 |
| 5,869,727 A | 2/1999 | Crane | | |
| 5,986,022 A | 11/1999 | Austin | | |
| 6,576,623 B1 | 6/2003 | Nakanishi | | |
| 6,897,280 B2 * | 5/2005 | Heisler et al. | .................... | 528/15 |
| 7,550,514 B2 * | 6/2009 | Rautschek et al. | ............. | 516/124 |
| 7,645,360 B2 * | 1/2010 | Burger et al. | ............... | 162/164.4 |
| 2004/0122113 A1* | 6/2004 | Zeng | ............................. | 516/124 |
| 2008/0064806 A1* | 3/2008 | Schneider et al. | ............ | 524/493 |
| 2008/0200608 A1* | 8/2008 | Burger et al. | .................. | 524/588 |
| 2011/0021688 A1* | 1/2011 | Herzig et al. | .................. | 524/500 |

FOREIGN PATENT DOCUMENTS

| | | |
|---|---|---|
| DE | 3133869 C1 | 5/1983 |
| DE | 69918588 T2 | 2/2006 |

* cited by examiner

*Primary Examiner* — Randy Gulakowski
*Assistant Examiner* — Mike M Dollinger
(74) *Attorney, Agent, or Firm* — Brooks Kushman P.C.

(57) ABSTRACT

Silicone polyethers are prepared in a two stage process by reacting an unsaturated polyether with a first Si—H functional organopolysiloxane and then with a second organopolysiloxane, in which the weight ratio of silicon bonded hydrogen in the first and second organopolysiloxanes is at least 0.9. The reaction is more rapid than a single step process and produces a product with less unreacted Si—H content.

14 Claims, No Drawings

METHOD FOR PRODUCING SILICONE POLYETHERS

CROSS-REFERENCE TO RELATED APPLICATION

This application is the U.S. national phase of PCT Appln. No. PCT/EP2009/052479 filed Mar. 3, 2009 which claims priority to German application DE 10 2008 000 525.8 filed Mar. 5, 2008.

BACKGROUND OF THE INVENTION

1. Field of the Invention

This invention relates to a method for producing silicone polyethers.

2. Description of the Related Art

DE 31 33 869 C1 (U.S. Pat. No. 4,417,068 A) describes generally the production of silicone polyethers from hydrosiloxanes and alkenyl polyethers in a noble metal catalyzed hydrosilylation reaction. The examples show the influence of catalyst quantity and catalyst structure on the conversion of the SiH groups. The SiH conversion achievable per unit time for a given type of catalyst can only be significantly increased through appreciably higher noble metal concentrations, which is costly and therefore disadvantageous.

A fundamental problem with the production of silicone polyethers is low miscibility of the polymeric feedstocks, which generally results in the reaction mixture being initially biphasic and the production first proceeding very sluggishly.

As is known from U.S. Pat. No. 5,869,727, this disadvantage can be eliminated by adding volatile solvents which can be redistilled off again on completion of the synthesis. The advantage of faster reaction kinetics comes at the cost of a longer product workup and a poorer space-time yield.

SUMMARY OF THE INVENTION

It is an object of the present invention to provide a method wherein the abovementioned disadvantages are avoided and wherein the conversion of the SiH groups is improved. These and other objects are achieved by a process in which a polyether containing unsaturated hydrosilylatable groups is initially reacted with an organopolysiloxane having from 0.2 to 1.6 weight percent of silicon bonded hydrogen, and also reacted with a further organopolysiloxane having 0.02 to 1 weight percent silicon bonded hydrogen atoms, wherein the ratio of silicon bonded hydrogen atoms in the first organopolysiloxane to the further organopolysiloxane is at least 0.9.

DETAILED DESCRIPTION OF THE PREFERRED EMBODIMENTS

The present invention accordingly provides a method for producing silicone polyethers wherein
(i) in a first step unsaturated polyethers (3) of the general formula $$CH_2=CR^1-(CH_2)_aO\,(C_2H_4O)_b(C_3H_6O)_cR^1 \quad (I),$$

where
$R^1$ is a hydrogen atom or a hydrocarbyl radical having 1 to 6 carbon atoms,
a is 0 or an integer from 1 to 16,
b is 0 or an integer from 1 to 50, and
c is 0 or an integer from 1 to 50, are reacted with organopolysiloxanes (1), which contain from 0.2% to 1.6% by weight of silicon bonded hydrogen atoms, and
(ii) in a second step, organopolysiloxanes (2), which contain from 0.02% to 1.0% by weight of silicon bonded hydrogen atoms, are added to the reaction mixture of the first step, with the proviso that the reactions in the first and second steps are carried out in the presence of catalysts (4), which promote the addition of silicon bonded hydrogen onto aliphatic double bonds, and that the ratio of the weight concentration of silicon bonded hydrogen in organopolysiloxane (1) to the weight concentration of silicon bonded hydrogen in organopolysiloxane (2) is at least 0.9, preferably at least 1.0 and more preferably at least 1.5.

It is particularly preferable for the method of the present invention to utilize a ratio for the weight concentration of silicon bonded hydrogen in organopolysiloxane (1) to the weight concentration of silicon bonded hydrogen in organopolysiloxane (2) of at least 2.0 because this provides particularly rapid and complete conversions.

It is preferable for the method of the present invention to utilize a ratio for the weight concentration of silicon bonded hydrogen in organopolysiloxane (1) to the weight concentration of silicon bonded hydrogen in organopolysiloxane (2) of at most 50 and preferably at most 20.

The first step of the method of the present invention preferably utilizes organopolysiloxanes (1) in amounts of 0.2 to 0.7, more preferably 0.3 to 0.6, gram atom of silicon bonded hydrogen per mole of aliphatic double bond in the polyethers (3).

The second step of the method of the present invention preferably utilizes organopolysiloxanes (2) in amounts of 0.1 to 0.6, more preferably 0.2 to 0.5, gram atom of silicon bonded hydrogen per mole of aliphatic double bond in the polyethers (3).

The method of the present invention preferably utilizes organopolysiloxanes (1) and (2) altogether in amounts from 0.5 to 1.0, preferably 0.6 to 0.8, gram atom of silicon bonded hydrogen per mole of aliphatic double bond in the polyethers (3).

Organopolysiloxanes (1) preferably comprise linear, cyclic or branched organopolysiloxanes composed of units of the general formula $$R_eH_fSiO_{\frac{4-e-f}{2}}, \quad (II)$$

where
R in each occurrence may be the same or different and is a monovalent hydrocarbyl radical having 1 to 18 carbon atoms which is free of aliphatic carbon-carbon multiple bonds,
e is 0, 1, 2 or 3,
f is 0, 1 or 2,
and the sum total of e +f is $\leqq 3$,
with the proviso that at least 2 silicon bonded hydrogen atoms are included.

Preference for use as organopolysiloxanes (1) is given to organopolysiloxanes of the general formula $$H_hR_{3-h}SiO(SiR_2O)_o(SiRHO)_pSiR_{3-h}H_h \quad (III)$$

where R is as defined above,
h is 0, 1 or 2, preferably 0 or 1,
o is 0 or an integer from 1 to 40, preferably 2 to 20, and p is 0 or an integer from 1 to 40, preferably 2 to 20, with the proviso that at least two silicon bonded hydrogen atoms are included.

Formula (III) herein is to be understood as meaning that o —(SiR₂O)— units and p —(SiRHO)— units can be distributed in the organopolysiloxane molecule in any desired manner, for example as a block or randomly.

Examples of such organopolysiloxanes (1) are more particularly copolymers composed of trimethylsiloxane, dimethylsiloxane and methylhydrosiloxane units, copolymers composed of dimethylhydrosiloxane, methylhydrosiloxane, dimethylsiloxane and trimethylsiloxane units, copolymers composed of trimethylsiloxane, dimethylhydrosiloxane and methylhydrosiloxane units, copolymers composed of methylhydrosiloxane and trimethylsiloxane units, copolymers composed of methylhydrosiloxane, diphenylsiloxane and trimethylsiloxane units, copolymers composed of methylhydrosiloxane, dimethylhydrosiloxane and diphenylsiloxane units, copolymers composed of methylhydrosiloxane, phenylmethylsiloxane, trimethylsiloxane and/or dimethylhydrosiloxane units, copolymers composed of methylhydrosiloxane, dimethylsiloxane, diphenylsiloxane, trimethylsiloxane and/or dimethylhydrosiloxane units, and also copolymers composed of dimethylhydrosiloxane, trimethylsiloxane, phenylhydrosiloxane, dimethylsiloxane and/or phenylmethylsiloxane units.

The organopolysiloxanes (1) preferably have an average viscosity of 0.5 to 50 mm²/s at 25° C., more preferably 2 to 20 mm²/s at 25° C.

Organopolysiloxanes (2) preferably comprise linear, cyclic or branched organopolysiloxanes composed of units of the general formula $$R_k H_l SiO_{\frac{4-k-l}{2}}, \quad (IV)$$

where
R in each occurrence may be the same or different and is a monovalent hydrocarbyl radical having 1 to 18 carbon atoms which is free of aliphatic carbon-carbon multiple bonds,
k is 0, 1, 2 or 3,
l is 0, 1 or 2,
and the sum total of k +1 is ≦3,
with the proviso that at least 2 silicon bonded hydrogen atoms are included.

Preference for use as organopolysiloxanes (2) is given to organopolysiloxanes of the general formula $$H_g R_{3-g} SiO(SiR_2O)_r(SiRHO)_s SiR_{3-g} H_g \quad (V)$$

where R is as defined above,
g is 0, 1 or 2, preferably 0 or 1,
r is 0 or an integer from 1 to 500, preferably 20 to 200, and
s is 0 or an integer from 1 to 100, preferably 2 to 50,
with the proviso that at least 2 silicon bonded hydrogen atoms are included.

Formula (V) herein is to be understood as meaning that r —(SiR₂O)— units and s —(SiRHO)— units can be distributed in the organopolysiloxane molecule in any desired manner, for example as block or randomly.

Examples of organopolysiloxanes (1) are also fully applicable to organopolysiloxanes (2).

The organopolysiloxanes (2) preferably have an average viscosity of 5 to 5000 mm²/s at 25° C., more preferably 20 to 500 mm²/s at 25° C.

The ratio of the viscosities of organopolysiloxanes (2) to organopolysiloxanes (1) is preferably at least 1.0, more preferably at least 2.0 and even more preferably at least 3.0. Preferably, the viscosity ratio of organopolysiloxanes (2) to organopolysiloxanes (1) is preferably at most 1000 and more preferably at most 100.

Examples of R radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m-, p-tolyl radicals, xylyl and ethylphenyl radicals; and aralkyl radicals such as the benzyl, α-phenylethyl and β-phenylethyl radicals.

Examples of $R^1$-hydrocarbyl radicals are alkyl radicals such as methyl, ethyl, n-propyl, isopropyl, 1-n-butyl, 2-n-butyl, isobutyl, tert-butyl, n-pentyl, isopentyl, neopentyl, and tert-pentyl, and hexyl radicals such as n-hexyl and isohexyl.

An $R^1$ radical is preferably a hydrogen atom.

Polyethers (3) may be either one or more than one species of polyethers of the formula (I). Preferably, however, one species of polyethers (3) is reacted with the organopolysiloxanes (1) and (2).

It is preferable for a in formula (I) to be 1 and preference is given to using allyl polyethers.

Examples of polyethers (3) are

CH₂=CH—CH₂O(C₂H₄O)₅H, CH₂=CH—CH₂O (C₂H₄O)₈H,

CH₂=CH—CH₂O(C₂H₄O)₁₂—CH₃, CH₂=CH— CH₂O(C₃H₆O)₆H,

CH₂=CH—CH₂O(C₃H₆O)₁₈H, CH₂=CH—CH₂O (C₂H₄O)₁₅(C₃H₆O)₁₅H, and

CH₂=CH—CH₂O(C₂H₄O)₆(C₃H₆O)₄₄C(=O)CH₃.

Catalysts (4), which promote the addition of silicon bonded hydrogen onto aliphatic double bonding, can be any catalyst useful for promoting the addition of silicon bonded hydrogen onto aliphatic double bonds. The catalysts preferably comprise a metal from the group of the platinum metals, or a compound or complex from the group of the platinum metals. Examples of such catalysts are metallic and finely divided platinum, which may be on supports such as silica, alumina or activated carbon, compounds or complexes of platinum such as platinum halides, e.g. PtCl₄, H₂PtCl₆.6H₂O, Na₂PtCl₄.4H₂O, platinum-olefin complexes, platinum-alcohol complexes, platinum-alkoxide complexes, platinum-ether complexes, platinum-aldehyde complexes, platinum-ketone complexes, including reaction products of H₂PtCl₆.6H₂O and cyclohexanone, platinum-vinyl-siloxane complexes such as platinum-1,3-divinyl-1,1,3,3-tetramethyldisiloxane complexes with or without detectable presence of inorganically bound halogen, bis(gamma-picoline)platinum dichloride, trimethylenepyridine-platinum dichloride, dicyclopentadieneplatinum dichloride, dimethylsulfoxide-ethyleneplatinum(II) dichloride, cyclooctadieneplatinum dichloride, norbornadieneplatinum dichloride, gamma-picolineplatinum dichloride, cyclopentadieneplatinum dichloride, and also reaction products of platinum tetrachloride with olefin and primary amine or secondary amine or primary and secondary amine, such as the reaction product of platinum tetrachloride dissolved in 1-octene with sec-butylamine, or ammonium-platinum complexes.

Catalyst (4) is preferably used in the method of the present invention in amounts from 1 to 50 ppm by weight (parts by weight per million parts by weight), more preferably in amounts from 5 to 20 ppm, each calculated as elemental platinum and based on the total weight of the components (1), (2) and (3) used.

In the method of the present invention, catalyst (4) is preferably added to polyether (3) prior to the metered addition of the organopolysiloxanes (1) and (2). Preferably, some of the catalyst is initially charged in the first step, the remainder is added in the second step.

The method of the present invention is preferably carried out at a temperature of 60 to 120° C., more preferably 80 to 120° C., and preferably at the pressure of the ambient atmosphere, i.e., at 1020 hPa, for example, but it can also be carried out at higher or lower pressures.

Solvents can be used in the method of the present invention. Examples of solvents are toluene, xylene, isopropanol, and n-butanol.

When solvents are used, they are preferably used in amounts of 5% to 20% by weight, based on the reaction mixture.

However, the use of solvent is not preferred.

The method of the present invention preferably provides as silicone polyethers, linear, cyclic or branched organopolysiloxanes composed of units of the general formula

where
A is a polyether radical of the general formula

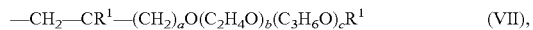

R, R¹, a, b and c are each as defined above,
x is 0, 1 or 2,
y is 0, 1, 2 or 3,
and the sum total of x+y is $\leq 3$,
with the proviso that at least 2 polyether radicals A are included.

The method of the present invention preferably provides as silicone polyethers those of the general formula

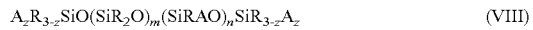

where
A and R are each as defined above,
z is 0, 1 or 2, preferably 0 or 1,
m is 0 or an integer from 1 to 300, preferably from 10 to 150, and
n is 0 or an integer from 1 to 50, preferably 2 to 30,
with the proviso that at least 2 polyether radicals A are included.

Formula (VIII) herein is to be understood as meaning that m —(SiR$_2$O)— units and n —(SiRAO)— units can be distributed in the organopolysiloxane molecule in any desired manner, for example as block or randomly.

The silicone polyethers obtained by the process of the present invention preferably have a viscosity of 50 to 100 000 mPa·s at 25° C., more preferably 100 to 20 000 mPa·s at 25° C.

The process of the present invention has the advantage that high SiH conversions are achieved. Preferably an SiH conversion of at least 94%, more preferably of 96% or more is achieved. Preferably, the silicone polyethers obtained by the process of the present invention contain at most 0.01% by weight and more preferably at most 0.005% by weight of SiH groups.

INVENTIVE EXAMPLE 1

773 g of an allyl polyethoxylate having an iodine number of 53.3 (corresponding to 1.54 equivalents of C=C) are activated with 0.3 g of cyclohexene oxide and 1.04 g of a solution of hexachloroplatinic acid in isopropanol (corresponding to 5 mg of Pt) and heated to 100° C. under N$_2$ atmosphere. Following metered addition of 87 g of an organopolysiloxane (H-siloxane 1) consisting of hydromethylsiloxane, dimethylsiloxane and trimethylsiloxane units, which contains 0.63% by weight of silicon bonded hydrogen and has an average chain length of 10.2 silicon atoms (corresponding to 0.55 equivalents of SiH), during 30 minutes and a further 30 minutes of subsequent reaction, about 350 g of short chain silicon polyether dissolved in 470 g of allyl polyether are obtained. At 100° C., with cooling, 177 g of an organopolysiloxane (H-siloxane 2) similar to H-siloxane 1, but containing 0.31% by weight of silicon bonded hydrogen and having an average chain length of 39 silicon atoms (corresponding to 0.55 equivalents of SiH) are added by metered addition and at the same time the same amount of platinum catalyst is added once more.

The entire batch has a 10.0 ppm Pt content. The ratio of the weight concentration of silicon bonded hydrogen in H-siloxane 1 to the weight concentration of silicon bonded hydrogen in H-siloxane 2 is 2.03. Altogether a C=C/SiH ratio of 1.40 (or correspondingly an SiH/C=C ratio of 0.71) was used. 91 minutes after the start of the metered addition of H-siloxane 2, the reaction mixture becomes clear again. After a further hour, only 3.6% by weight of the silicon bonded hydrogen used is still present (SiH conversion 96.4%). The silicone polyether obtained has a viscosity of 495 mm$^2$/s (25° C.) and contains 0.0038% by weight of silicon bonded hydrogen.

Comparative Test:

On observing a C=C/SiH ratio of 1.40 similar to inventive example 1, 667 g of the allyl polyethoxylate of inventive example 1 are reacted at 100° C. with 322 g of the same organopolysiloxane (H-siloxane 2) as in inventive example 1, which contains 0.31% by weight of silicon bonded hydrogen and has an average chain length of 39 silicon atoms. As in inventive example 1, the mixture contains 5 mg of Pt in identical form and 0.3 g of cyclohexene oxide. On completion of the metered addition the same amount of platinum catalyst is added once more. After a further 80 minutes of reaction time at the same temperature (190 minutes from the start of the metered addition) the reaction mixture still contains 10.4% by weight of the silicon bonded hydrogen used (SiH conversion 89.6%) and after a further hour still 6.1% by weight (SiH conversion 93.9%). Hence the hydrosilylation is slower and less complete than when performed by the hydrosilylation in two steps as per inventive example 1 using H-siloxane 1 and H-siloxane 2, which differ from each other in that H-siloxane 1 has a shorter chain length and is richer in SiH groups.

INVENTIVE EXAMPLE 2

Inventive example 1 is repeated analogously except that a silicone polyether is produced in twice the amount of the previously produced silicone polyether. To this end, 1100 g of the allyl polyether (corresponding to 2.31 equivalents of C═C) of inventive example 1 are activated with 0.4 g of cyclohexene oxide and 1.52 g of the platinum catalyst solution (corresponding to 7.3 mg of Pt) of inventive example 1 and heated to 100° C. under N₂ atmosphere. Following the metered addition of 174 g of the same organopolysiloxane, H-siloxane 1, as in inventive example 1 during 30 minutes and a further 30 minutes of subsequent reaction, about 700 g of short chain silicone polyether dissolved in allyl polyether are obtained. The hydrosilylation is then carried out with the same organopolysiloxane, H-siloxane 2, as in inventive example 1 and using the identical amounts to inventive example 1. The reaction mixture this time becomes clear again after just 45 minutes from the start of the metered addition and after a further hour just 3.5% by weight of the silicon bonded hydrogen used are left (SiH conversion 96.5%). The reaction proceeds even more quickly than in inventive example 1 and substantially more quickly than the reaction in the prior art as represented in the comparative test. The silicone polyether obtained contains 0.0040% by weight of silicon bonded hydrogen. Owing to the higher proportion of the low molecular weight silicone polyether, the viscosity of the product is lower than in inventive example 1 and has a value of 347 mm²/s (25° C.).

Since the amounts of H-siloxane 1 and H-siloxane 2 can be varied relative to each other in any proportion, any desired product viscosities are achievable within wide limits.

INVENTIVE EXAMPLE 3

In this example, the siloxanes 1 and 2 are metered concurrently and not in succession, and so one species of silicone polyether is formed during the production of the second species of the silicone polyether.

Inventive example 1 is thus repeated except that, although the same total amount of the same starting materials is used, the 87 g of H-siloxane 1 and 177 g of H-siloxane 2 are mixed to form a homogeneous mixture and hence are metered at exactly the same time, and the second amount of platinum catalyst is directly added thereafter. Hence the concentration of reactants is exactly the same as in inventive example 1. Measured from the start of the metered addition, the reaction mixture this time becomes clear after 93 minutes, which is only minimally longer than the clarification after metered addition of H-siloxane 2 in inventive example 1. After a further hour at 100° C., the amount of silicon bonded hydrogen measured is only 4.5% by weight of the starting level (SiH conversion 95.5%). The silicone polyether obtained has a viscosity of 490 mm²/s (25° C.), which is similar to that in inventive example 1.

The SiH conversion is lower than in inventive example 1, but still significantly better than in the comparative example notwithstanding a shorter reaction time.

What is claimed is:
1. A method for producing silicone polyethers, comprising reacting
(i) in a first step
unsaturated polyethers (3) of the formula

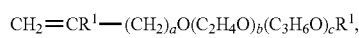

(I)

where $R^1$ is a hydrogen atom or a hydrocarbyl radical having 1 to 6 carbon atoms,
a is 0 or an integer from 1 to 16,
b is 0 or an integer from 1 to 50, and
c is 0 or an integer from 1 to 50,
with organopolysiloxanes (1), which contain from 0.2% to 1.6% by weight of silicon bonded hydrogen,
and
(ii) in a second step, adding
organopolysiloxanes (2), which contain from 0.02% to 1.0% by weight of silicon bonded hydrogen, the percent by weight of silicon bonded hydrogen in a organopolysiloxanes (2) being less than the percent by weight of silicon bonded hydrogen in organopolysiloxanes (1), to the reaction mixture of the first step and reacting the organopolysiloxanes (2) with a product mixture produced in the first step,
with the proviso that reacting in the first and second steps is carried out in the presence of at least one catalyst (4) which promotes the addition of silicon bonded hydrogen onto an aliphatic double bond, and
the ratio of the weight concentration of silicon bonded hydrogen in organopolysiloxane (1) to the weight concentration of silicon bonded hydrogen in organopolysiloxane (2) is at least 0.9 and wherein the conversion of silicon bonded hydrogen groups is at least 94% after 3.5 hours at 100° C.

2. The method of claim 1, wherein the ratio of the weight concentration of silicon bonded hydrogen in organopolysiloxane (1) to the weight concentration of silicon bonded hydrogen in organopolysiloxane (2) is at least 1.5.

3. The method of claim 1, wherein in the first step, organopolysiloxane (1) is reacted in an amount of 0.2 to 0.7 gram atom of silicon bonded hydrogen per mole of aliphatic double bond in polyether (3).

4. The method of claim 2, wherein in the first step, organopolysiloxane (1) is reacted in an amount of 0.2 to 0.7 gram atom of silicon bonded hydrogen per mole of aliphatic double bond in polyether (3).

5. The method of claim 1, wherein in the second step, organopolysiloxane (2) is reacted in an amount of 0.1 to 0.6 gram atom of silicon bonded hydrogen per mole of aliphatic double bond in polyether (3).

6. The method of claim 2, wherein in the second step, organopolysiloxane (2) is reacted in an amount of 0.1 to 0.6 gram atom of silicon bonded hydrogen per mole of aliphatic double bond in polyether (3).

7. The method of claim 3, wherein in the second step, organopolysiloxane (2) is reacted in an amount of 0.1 to 0.6 gram atom of silicon bonded hydrogen per mole of aliphatic double bond in polyether (3).

8. The method of claim 4, wherein in the second step, organopolysiloxane (2) is reacted in an amount of 0.1 to 0.6 gram atom of silicon bonded hydrogen per mole of aliphatic double bond in polyether (3).

9. The method of claim 1, wherein organopolysiloxanes (1) and (2) are used altogether in amounts of 0.5 to 1.0 gram atom of silicon bonded hydrogen per mole of aliphatic double bond in polyether (3).

10. The method of claim 3, wherein organopolysiloxanes (1) and (2) are used altogether in amounts of 0.5 to 1.0 gram atom of silicon bonded hydrogen per mole of aliphatic double bond in polyether (3).

11. The method of claim 5, wherein organopolysiloxanes (1) and (2) are used altogether in amounts of 0.5 to 1.0 gram atom of silicon bonded hydrogen per mole of aliphatic double bond in polyether (3).

12. The method of claim 1, wherein organopolysiloxanes (1) comprise organopolysiloxanes of the formula $$H_hR_{3-h}SiO(SiR_2O)_o(SiRHO)_pSiR_{3-h}H_h \quad (III)$$

R each individually is a monovalent C1-18 hydrocarbon radical free of aliphatic carbon-carbon multiple bonds, where h is 0, 1 or 2,
o is 0 or an integer from 1 to 40 and
p is 0 or an integer from 1 to 40,
with the proviso that at least two silicon bonded hydrogen atoms are included, and the $_o$SiR$_2$O and $_p$SiRHO groups are distributed in any manner in the organopolysiloxane (1).

13. The method of claim 1, wherein organopolysiloxanes (2) comprise organopolysiloxanes of the formula $$H_gR_{3-g}SiO(SiR_2O)_r(SiRHO)_sSiR_{3-g}H_g \quad (V)$$

R each individually is a monovalent C1-18 hydrocarbon radical free of aliphatic carbon-carbon multiple bonds, where g is 0, 1 or 2,
r is 0 or an integer from 1 to 500, and
s is 0 or an integer from 1 to 100,
with the proviso that at least 2 silicon bonded hydrogen atoms are included, and the $_r$SiR$_2$O and $_s$SiRHO groups are distributed in any manner in the organopolysiloxane (2).

14. The method of claim 1, wherein organopolysiloxanes (1) and (2) are linear organopolysiloxanes, and the chain length of organopolysiloxane (1) is less than the chain length of organopolysiloxane (2).

* * * * *